June 7, 1927.
C. N. ANDREWS
ART OF AND MEANS FOR METRICAL OPTIC AND
ACOUSTIC RECORDING AND REPRODUCTION
Original Filed Feb. 3, 1920   3 Sheets-Sheet 3
1,631,450
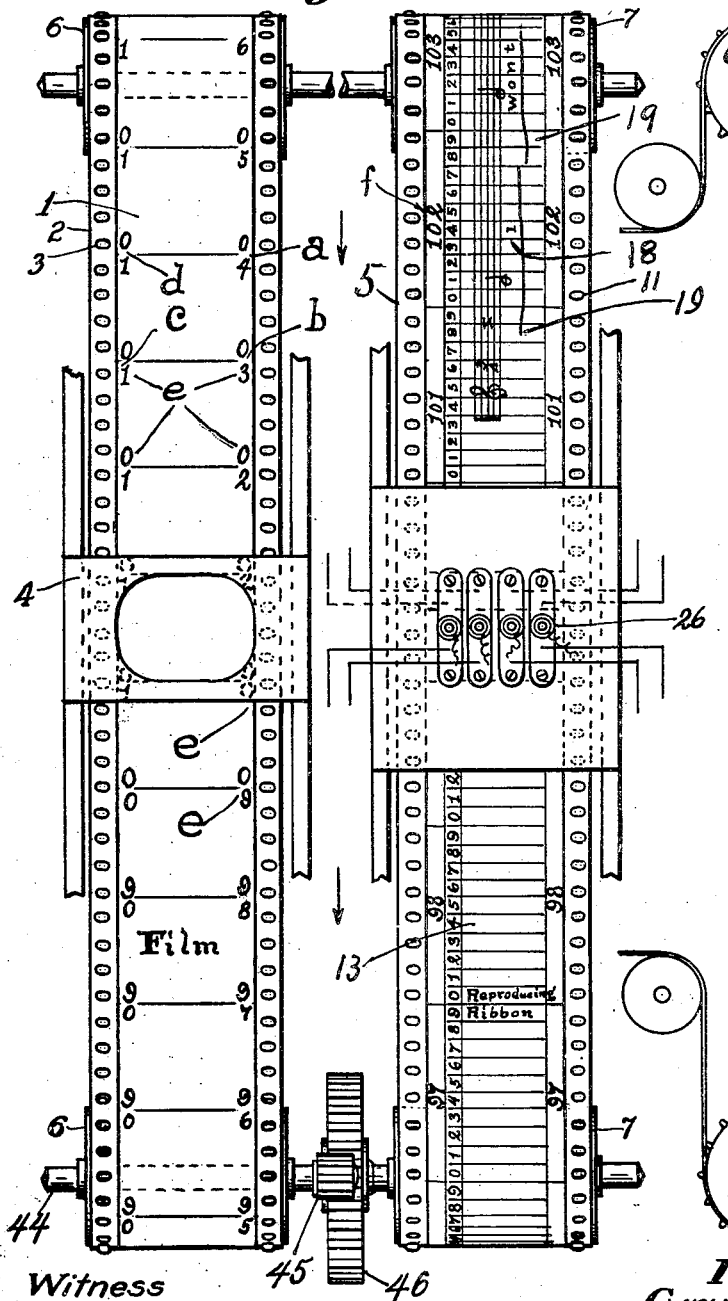
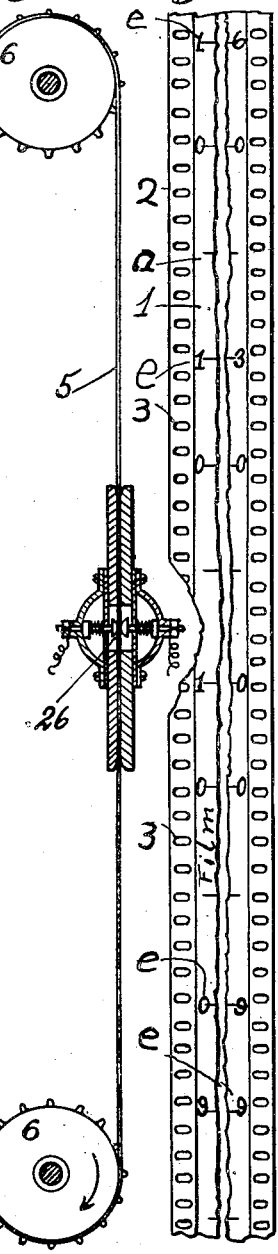

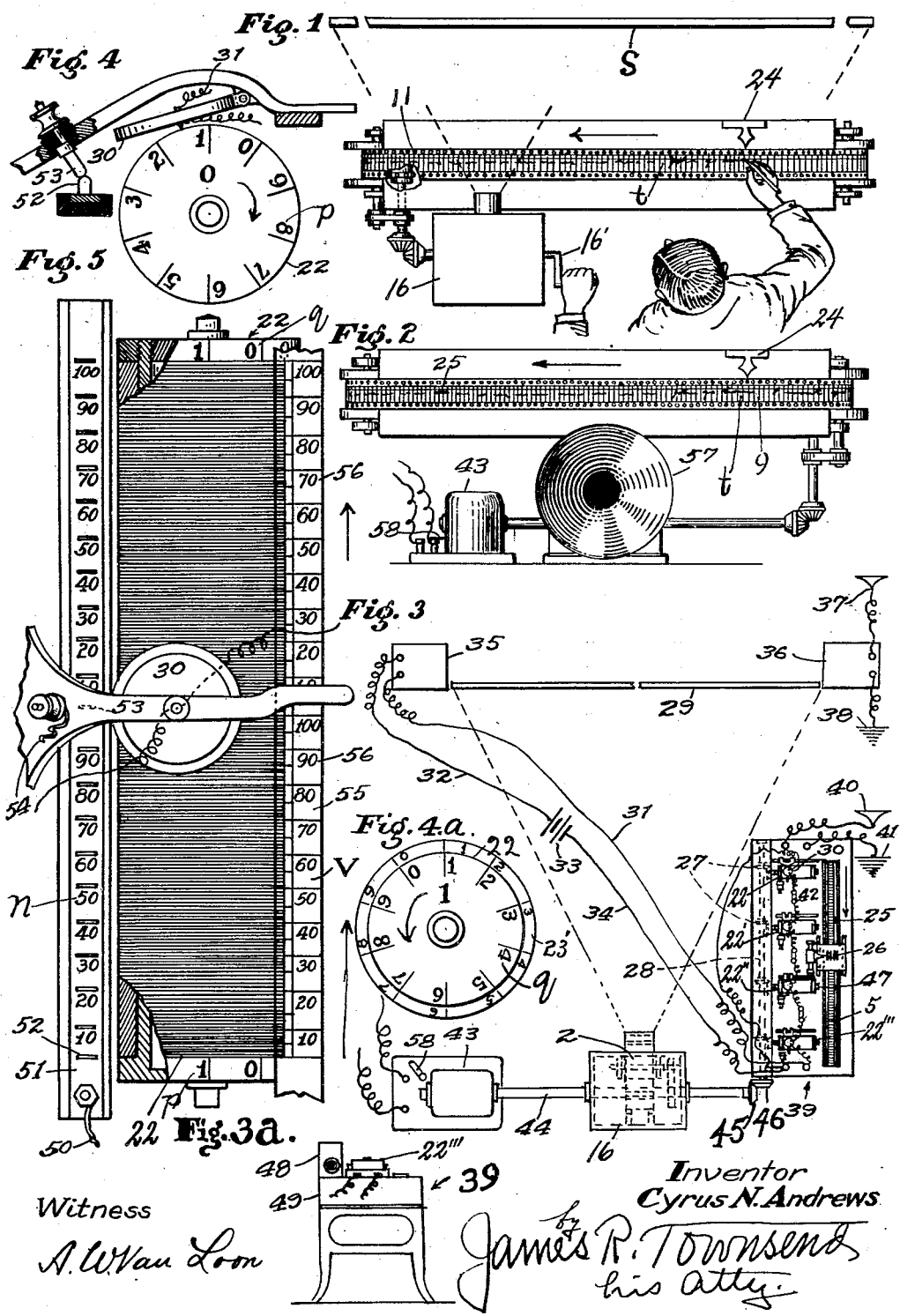
June 7, 1927.
C. N. ANDREWS
ART OF AND MEANS FOR METRICAL OPTIC AND
ACOUSTIC RECORDING AND REPRODUCTION
Original Filed Feb. 3, 1920    3 Sheets-Sheet 1
1,631,450

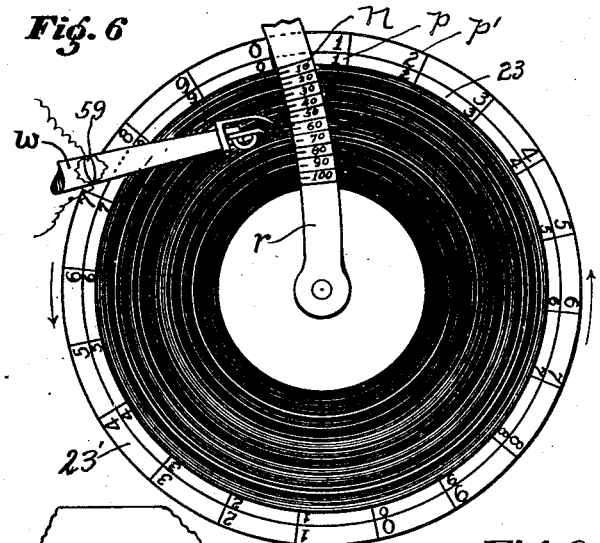

Patented June 7, 1927.

1,631,450

UNITED STATES PATENT OFFICE.

CYRUS NEWTON ANDREWS, OF YUCAIPA, CALIFORNIA.

ART OF AND MEANS FOR METRICAL OPTIC AND ACOUSTIC RECORDING AND REPRODUCTION.

Application filed February 3, 1920, Serial No. 356,037. Renewed November 11, 1925.

An object of this invention is to make a popular talking motion picture.

An object is to provide for a completed motion picture, an appropriate sound action record device and an index for both so that no consideration with respect to the co-ordination of the motion picture with the sound reproduction is demanded of the actor or the photographer during the recording of the picture, provided the visual accompaniments of the requisite sounds are appropriately produced. To this end I provide a time unit index tape, the same constituting a synchronistic index of the sound and picture units.

It frequently occurs in actual practice that a pleasing actor is not possessed of a suitable registering voice or a voice which is pleasing or is appropriate to the part played by the actor in producing a particular motion picture, and an object of this invention is to make it practical to select the best vocalists appropriate to the respective parts and to apply their vocal productions to the work of the actors so that the total result of the talking motion picture will be more pleasing and will be more under the control of the producer than has ever been possible heretofore, thus giving a production superior even to the so-called legitimate drama.

An object of this invention is to produce a synchronized metrical sound record for talking motion pictures which will be positive, definite, clear-cut and accurate; and a broadly new, basic pioneer and primary feature of this invention resides in the production of a synchronized metrical sound record by a reader reading from a reading tape which has been metrically produced in synchronism with a projection of an indexed metrical motion picture. That is to say, this invention is a departure from prior attempts to produce a synchronized sound and motion picture production in that the projection of an indexed motion picture is used as the basis of operation; the principle being that sight rather than sound, dominates as the standardizing medium. In this connection I first produce an indexed motion picture film; then project the same, and by reference to said projection produce on an indexed reading tape which is marked off into index spaces indicating time units and being a visual index of the sounds to be synchronized with the motion picture projection; and this indexed reading tape is then used by a reader in producing or directing the production of a synchronized metrical sound record device which is then used in synchronism with the indexed motion picture film for the purpose of producing a sound accompaniment to the picture projection.

A marked difference between former practice, and the practice of the art in accordance with my invention, will be seen when it is recognized that the stoppage of a sound record results in elimination of the sound; and running the sound record slowly makes the sound indistinct and difficult to be understood; while by my new method the sound, as such, is not dealt with until everything is prepared for the final production of the sound record; the whole attention being directed to the indexed picture projection as the medium of measurement; and such picture projection can be slowed down or can be stopped entirely without losing the projected picture which remains upon the screen, irrespective of whether the film is running or standing still. In each instance a picture remains before the eye; and by turning the film backward or forward, the exactitude of synchronism can be determined before any sound record is produced, thus enabling the elocutionist, musician, or orator to produce the sound record exactly in synchronism with the action of the picture without depending upon sounds emanating from a previously formed record.

A principle of this invention is that I bring into correlation on the respective picture and sound records, the time involved in any portion of a picture and the sound accompaniment of such portion and the space occupied by the records respectively made on the film and on the sound record, and I mark off on an index tape or ribbon, spaces of such length that when the tape and film are run synchronously, each space marked on the tape or ribbon will move past a given point in the same time that is required for the movement of the correlated spaces on the film and on the sound record device.

The spaces on the film, I term picture units and the spaces on the sound record device I term sound units, and the spaces on the index tape or ribbon, I term time units for the reason that the index tape or ribbon, exhibits to the eye the time for each picture exposure, and each sound accompaniment for such exposure. Where such exposures are at the rate of sixteen per second, the arrangement is such that sixteen of the time units will pass a given point in one second and likewise if the exposures are twenty to the second, then twenty of said time units will pass such given point in each second, so that the correspondence of movement between the film, the sound record device, and the index tape or ribbon, is accurately exhibited to the eye by the time unit marking on said index tape or ribbon.

By thus dividing the visual index tape into time unit spaces, each of which travels across a certain space in exact synchronism with the movement of the film for each picture frame, and the sound accompaniment therefor, I have made it possible for one to absolutely and positively determine from observation of the index tape, the accompaniment appropriate to each motion produced on the screen by projection from the picture film, so that for reproducing synchronously the visual action and the sound action, it is only necessary to make provision whereby the sound record device, the film, and the index ribbon, shall be run in exact synchronism. And when the index or time unit ribbon has been provided for the picture, the sound accompaniment may be composed and indexed as the picture is run, and the vocalist or other sound producer may then produce a sound record device to correspond to the time unit index without having to observe the picture or to have the picture run while the sound record is being produced.

An object of this invention therefore is to make provision whereby different parts of the sound record device may be produced by different vocalists at widely separated times and places and then assembled and combined for final production with the projection from the picture film with absolute certainty that the picture and its sound accompaniment can be produced in synchronism. Said tape comprises a metrical sound indicating strip containing an optical record of the sound accompaniment of any picture production, arranged in metrical correspondence with the appropriate optical parts of such production, and provided with scale and index markings, and adapted to run in synchronism with a sound recorder, so that by operating said tape and recorder synchronously, the person who is to produce the sound record can read his part into the sound recorder from the sound indicating marks on the tape as they progress within his vision past a predetermined point; and in this way will be able to produce the requisite sound accompaniment in true time relation predetermined by the picture action. Said tape arrangement also serves as an index by which any part or portion of either the picture or of the sound record can be located.

By this means it becomes possible to locate on a sound record device the record of the different sounds, in such manner that they will synchronize with the action of the motion picture to which the optical sound indicating marks of the reading tape were made to agree.

The invention includes a broadly new and pioneer method of making sound records to synchronize with motion pictures, which employs a motion picture film and an indexed reproducer ribbon or register tape that are respectively provided with numerically corresponding spaces and with means whereby the spaces upon each may be made to pass a predetermined point in like number at a given time; so that by correspondingly indexing the spaces of the film and the ribbon or tape, it is not only made possible to locate any picture on the film by reference to the numbered space corresponding thereto on the ribbon or tape, but it is possible by reducing the width of the spaces on the ribbon or tape as compared with the width of the picture spaces on the film, to express the number of spaces on the ribbon or tape with a longitudinal movement of the ribbon or tape that is less than that movement of the film which is required in projecting the motion picture to which the ribbon or tape spaces appertain. This allows the ribbon or tape to be run slow enough for ordinary writing or printing thereon to be read with ease, and also allows dialogue to be brought into correspondence with the motion picture without drawing the writing or printing out too long.

In carrying out the method herein involved, after providing said indexed ribbon, tape and film, I cause the motion picture to be produced on the film in the ordinary way, taking care that the actors appropriately time the dialogue to the motions that are recorded on the film. Then by use of the scenario, from which the action was produced, and the libretto from which the dialogue and other audible sound actions are produced, and the indexed pictures slowly projected upon a screen, I apply to the spaces on the tape, written or printed words or other markings to indicate the sound action that accompanies the pictures on the corresponding faces of the film.

In this manner I provide a metrical apparatus including two parts, the film and the tape, which may be run in step with each other as desired, and which when so run, will simultaneously present to the eye, the motion picture and the words or other markings indicating the sound action that should occur as the picture is run.

I provide a sound recorder adapted to be run at a speed corresponding to the speed of the motion picture machine which has produced the film.

For producing the sound record that is to be used in the picture and sound reproduction, I employ a sound recorder timed with relation to the motion picture machine which produced the film to which the sound action is to be accommodated.

In motion picture practice at present the number of frames projected during reproduction is 16 per second, which equals 960 pictures per minute. I prefer to use a sound record disk of 48 revolutions per minute which represents said 960 pictures per minute. By dividing the circumference of the disk, or its table immediately outside the disk, into 20 equal segments, each segment represents the time during which one picture frame is exhibited.

In case a cylindrical record device is used, the same may be made to revolve 96 revolutions per minute, and by dividing the circumference into 10 equal spaces, the time for 10 picture frames will be indicated as equal to the time for one revolution of the cylindrical record.

That is to say, in order to systematize the work I assume that a 1,000 foot film representing 16,000 pictures is divided into 16 parts each of which contains 1,000 pictures and is termed a film section. A film section may be made to represent any suitable number of pictures.

Under the present practice, each frame in a motion picture film is three-quarters of an inch in extent along the film, thus making 16 pictures to each foot of film; and in reproduction, the film is run through the projecting machine at the rate of 1 foot, i. e. 16 pictures per second. The film is therefore divided into sections of 1,000 pictures, which represents 62½ feet in length of film, or 1 minute and 2½ seconds in length of time; and I apportion 50 revolutions of the disk or 100 revolutions of the cylinder, to each film section. It is thus seen that with a disk talking machine, 50 revolutions are accomplished in 1 minute 2½ seconds, and that during this time, 1,000 pictures are projected; and with a cylinder talking machine as applied by me, 100 revolutions accomplishes the same work.

A pioneer feature of this improvement in the art is that provision is made whereby the libretto can be translated into any desired language, so that the person making the sound record may make the same according to requirements irrespective of whether the actors can vocalize or are acquainted with the language in which the voice production is to be rendered. Furthermore the same picture may be synchronously accompanied by verbal rendition in any language or dialect.

Another advantage is that extraneous or objectionable sounds can be excluded and all desired sounds can be introduced and amplified or modified as may be determined at the time of making up for final production.

An advantage of the invention is the complete segregation of the work of producing the sound accompaniment from the work of producing the picture film. I am not aware that any attempt to attain such advantage, or any suggestion that such advantage could be attained has ever been heretofore made.

A further object of this invention, is the provision of means whereby the leader of an orchestra can be provided with a synchronized metrical music roll, by which he is enabled, through reading the music on the roll, to direct the orchestra in accordance with the movements of the motion picture, without any distraction or liability of mistake.

In carrying out the invention, I may number every picture, or second or third picture, as may be deemed most expedient, and I make provision whereby the position of any part of the sound record which corresponds to any picture, can be accurately determined.

An object of the invention is to so dispose the index numbers on the film as to avoid disfigurement of the picture by appearance of the numbers.

I have discovered that the practical way to produce talking motion pictures, is to first establish a motion picture record or film and to produce a motion picture therefrom, and, during such motion picture production, produce the sound accompaniment for such picture production, and, by means thereof, establish a sound record synchronized with the picture record; and then to produce from the two records, run in proper time relation to each other, both the visible and the auditory parts of the desired performance.

A pioneer and very important feature of this improvement is the application of latitudinal and longitudinal indexing of the rotary sound record. In connection therewith I number the respective records and by these means am enabled to locate any particular sound unit in any of such records.

Other objects, advantages and features of invention may appear from the accompanying drawings, the subjoined detailed description and the appended claims.

I shall now describe the art of recording and reproducing auditory and visual action in accordance with this discovery, and certain apparatus pertaining thereto and adapted to the practice of such art; reference being had to the accompanying drawings which illustrate the invention.

Figure 1 is a diagrammatic plan of the dialogue registering apparatus including a motion picture projector and screen, a registering tape with table therefor, and means for synchronously moving the tape along the table, and the motion picture film within the projector; whereby the registrar (shown in the view), may project the pictures to view, one by one or as otherwise desired, and may write on the tape a readable record of the dialogue and other sound accompaniments, accompanying the action of the projected picture, for the guidance of the person who is to subsequently produce the sound record that will be used in the final production of sound accompanying the motion picture production of the visual action of the production.

Fig. 2 is an elevation of the reading and sound recording apparatus including the reading tape, that is, the registering tape with dialogue thereon, a sound recorder including a recording horn, and mechanism for synchronous operation of said tape and sound recorder.

Fig. 3 is a diagrammatic plan of the combined talking and motion picture apparatus with reproducing ribbon and both wire and radio circuits.

Fig. 3ª is an elevation of the transmitter and reproducer.

Fig. 4 is an enlarged fragmental end elevation partly in section, of a part of the sound record recording and reproducing device or apparatus employing a cylinder talking machine.

Fig. 4ª is a reduced view of the end of the cylinder opposite that shown in Fig. 4.

Fig. 5 is a fragmental plan of the double record device shown in Fig. 4 as it might appear in operation as a sound reproducer.

Figs. 4, 4ª and 5 show the index numbers for the sound records, the segments thereof and the turns of the record groove.

Fig. 6 is a plan of a disk record device corresponding in purpose to the cylindrical record device shown in Fig. 5; said disk being in position for reproduction in a disk talking machine, fragments of which are shown.

Fig. 7 is a fragmental view of means in the form of a metrical directory for co-relating and indexing the action of the scenario and the words of the libretto in terms of film sections.

Fig. 8 is an enlarged fragmental view of a reading or recording tape showing its adaptation to affording the reader various translations of the same text.

Fig. 9 is a fragmental view of a metrical rythmic reading or recording tape with an English translation thereon, and pointer therefor.

Fig. 10 is a fragmental view of a reading or recording tape analogous to that shown in Fig. 9, and arranged as an orchestra score.

Fig. 11 is a fragmental view of an indexing ribbon for use in indexing the picture film.

Fig. 12 is a fragmental view of the metronomic means or mechanism for starting and turning the film and record in synchronism for reproduction. The record film is shown in elevation and the sound reproducer controlling record ribbon in plan.

Fig. 13 is a fragmental elevation at right angles to Fig. 12.

Fig. 14 is a reduced fragmental view of a skip number form of film.

In practice I provide each rotary sound record, disk or cylinder on the rotary table, therefor, with a metrical, segmental, circumferential scale, and with indicia thereon indicating the number of pictures represented by each revolution or rotation of the record and also with an indexed scale plate and busbar representing the number of revolutions of the record device to complete the record or any part thereof.

In carrying out my improvement in the art above referred to, each picture, not shown, will be printed in the usual way upon a suitable space or frame 1 on the film 2 which film is provided with the usual sprocket holes 3. Number spaces $a$, $b$, $c$, $d$, are left sufficiently blank at the corners of or at the junction of the picture frames of the film to permit the insertion into said spaces of digits $e$ running from zero to "9," both inclusive. When the picture film has been produced, the operator applies in the number spaces of each frame, the requisite numerals for numbering such frame for its respective picture. The first frame may be provided with zero in the upper, right hand corner and with blanks or zeros, in each of the other corners. In the immediately succeeding frames the numbers from zero to "9" will successively appear in said upper right hand corner while blanks or zeros appear in all of the other three corners. In the tenth frame zero is applied in the upper right hand corner and unity in the lower right hand corner, thus indicating that a cycle of ten frames has been run.

When 100 frames have been run, the digits from 1 to 9 and zero will have been applied in succession in the lower right hand corner, thus indicating ten cycles; all the digits from "1" to "9" and zero, will have appeared successively ten times in the upper right hand corner; and zero will appear in the upper and lower right hand corners and unity will be applied in the lower left hand corner, thus indicating that 100 frames have been run. Thus the operation of numbering is continued until unity is applied in the upper left hand corner and the other three corners are supplied with zeros indicating that a film section, or a run of 1,000 pictures, has occurred.

The numbering may thus be continued until a desired series less 10,000 pictures has been run. In a film of 1,000 feet, there will be 16,000 pictures; and I prefer to number the pictures in series of 8,000 pictures each, making 500 feet of film in each series or two series to each 1,000 foot reel. In case of a 2,000 foot film, the work would be continued in an analogous way. The numerals may be applied on every frame or applied across the space between certain frames, and in any case numbers may be omitted from every other frame; or, only every third frame may be provided with numerals as shown in Fig. 14.

In practice, to fit the picture film for the reception of the corner digits as shown in Fig. 12, a gate 4 may be applied to the camera to cover a sufficient portion of the corner to allow the digits to be marked on the film outside of that portion of the picture that will appear on the screen. By omitting said gate when the picture is being projected from a film numbered in the manner indicated in Fig. 12, the numbers of the film will appear on the screen; excepting, however, that the digit in the upper right hand corner will be imperceptible in the normal operation of the projecting apparatus and can only be determined when the film is slowly moving or at rest. A quick eye can catch the digit in the lower right hand corner during normal operation and the digits in the lower left hand corner will be practically stable, and those in the upper left hand corner will change but seldom.

The reproducing ribbon 5 is numbered as indicated at *f* in accordance with the proposed numbering of the film 2; and after the film has been numbered as at *e*, it is ready for use in inscribing a directory tape *t* which in turn will be used in the work of inscribing the libretto, et cet., on the reproducing ribbon 5 shown in Figs. 3 and 12, and analogous to the recording tape *t* and music roll *t'* shown in parallelism on parallel sprocket drums 6, 7 provided for each in the projector 16 and cabinet 48 respectively. The rotation of said drums will cause the ribbon and the film to travel in synchronism, and the operator, by inspection of the ribbon may, at any time, be able to note thereon, the number of the picture which is being projected at that particular time, irrespective of whether the gate 4 is open or is closed, to allow, or to prevent the projection of the numbers onto the screen.

In order to corelate the visual action or picture and the vocal accompaniment or sound action, the picture will be produced on a film 2 in the usual way, each of the actors speaking his part so as to record his lip action. The director or someone familiar with the scenario will provide a metrical directory *m* such as is shown in Fig. 7, on which will be written the prominent parts 8 of the scenario, and 9 of the libretto in proper relation to each other in accordance with the sound and the motion action of the play or other production. Then the registrar, with the gate 4 open, and with the metrical directory in view before him as indicated in Fig. 1, will project the picture upon the screen *s* whereon will thus be shown both the pictures and the picture numbers *e;* and he will note the numbers approaching the action of the scenario indicated at 8 on the metrical directory and also the dialogue 9 accompanying the same; and he will place the directory indexes 10 on the metrical directory *m* in juxtaposition to the inscriptions of the sound and motion parts of the production. After a general corelative metrical directory of the parts of the scenario and libretto has thus been prepared, the work of applying the libretto to the indexed metrical recording tape *t* shown in Figs. 8, 9 and 11 will be proceeded with. Said tape is provided with sprocket holes 11 corresponding to the sprocket holes 3 of the picture film, and is also provided with time units or numeral spaces 12, 12' and with the text space 13 which is set off with numbered transverse space lines 14 corresponding numerically to the picture frames 1, and respectively marking the exact time for each picture to be projected.

The spaces 12 and 12' and the spaces 13 are laid off relative to each other, each of the index spaces 12, 12' and 13 constituting and marking a time unit; that is to say, each of said spaces represents a unit of time which is the same in each tape, irrespective of the width of the space on the respective tapes; so that spaces representing the time unit on the film may be quite broad, and the spaces on the reading tape, quite narrow.

Where sixteen pictures per second are run through the picture machine, the time unit for one picture unit corresponds to the length of $\frac{1}{16}$ of a second and the sound unit corresponds to the space representing the duration of the sound for $\frac{1}{16}$ of a second. Correspondingly if twenty pictures are run through the picture machine in one second of time, the time unit on the picture film would be one picture and the time unit corresponding thereto, would be 1/20 of a second and the sound unit would be the space occupied on the sound film or record for 1/20 of one second. This is applicable to measurements on wires, ribbons, films and disks.

The tape is thus divided into narrow spaces the numbers of which are indicated by the index time unit numbers 15 and 15' in the index spaces 12 and 12'.

The index numbers are read by reading the numeral in the space 12 as thousands, hundreds and tens and the index numbers in the spaces 12' as units. For example, by observing the underscoring in Fig. 9 it is seen that the sound represented by the word "John" begins at No. 990 and the sound represented by I begins at No. 1018.

The text writer or registrar will then slowly run the numbered picture film through the projector 16 while the slide 4 is open, so that the numbers on the successive picture frames will appear on the screen. He will operate the projector slowly by suitable means, as by a detachable crank 16′; and by consulting the metrical directory, for concurrent parts of the scenario and libretto, he will apply the words of the libretto to the tape in correspondence to the picture and the verbal scenario 8; and will place on the numbered space of the tape, the sound marks or words 9 of the libretto corresponding to the action indicated by the words 8 of the scenario and in accordance with the numbered individual picture which is being projected. This will be done slowly as may be required, the inscription being applied to the tape as it passes a definite point 24. The beginning and ending of each word is indicated by an underscore 19 or 19′; the same being lines extending along the tape or strip and the tape will thus be provided with the text of the libretto in exact accordance with the appearance on the screen. This is indicated in Fig. 9 where the dialogue is represented as consisting of the two sentences 17 and 18, one of which consists of one long and two shortly spoken words "John, go home" and the second with the reply sung to the tune "I won't go home 'til morning."

The registrar will indicate the appropriate location and time value of the spoken words by the under scores 19, 19′, which are of greater or less length, depending upon the length of time employed in the action on the screen to pronounce the separate words. Thus in the illustration the words "John," "I" "won't," "home" and "morn" are represented by the comparatively long lines 19 as having been spoken deliberately; while the words "go" and "till" and the syllable "ing," are respectively represented by the short lines 19′ as having been spoken or sung quickly.

In this way the value and the exact position of each word with relation to the picture on the screen can be graphically placed on the tape $t$, before the eye of the registrar and eventually before the eye of the recorder operating the recording apparatus shown in Fig. 2.

In Fig. 10 the music score 20 is shown as applied across the metrical index spaces 21 on a music roll $t'$ which can be moved in synchronism with the action and the dialogue for the direction of the orchestra leader in playing accompanying music.

When the tape $t$ has been prepared as above described, it will be connected to run synchronously with a sound recording device either of the cylindrical, or of the disk type as indicated at 22 or 23, or of the film or ribbon type; and the parts are so arranged that during the operation of the record device the numbers 15, 15′ on the tape will synchronize with the numbers $n$, $p$, $p'$, or $q$, on the record device or the table 23′ and the radial arm $r$ thus affording for the record a latitudinal and a longitudinal index as at $n$, $p$, Fig. 6, and $n$, $p$ and $n$, $v$, Figs. 4, 4ª and 5.

The recorder will then cause synchronous operation of the tape and the sound record device, and will read into the sound recorder the words of the text as they pass the stationary index hand 24 of the recorder. In this way a sound record may be produced in perfect synchronism with the picture action, and the recorder may do this work perfectly with or without sight of the picture.

This operation may be performed in a studio by a vocal artist without any interference whatever with the artists who produce the picture; the voice employed may be suited to the purpose for which the picture is to be used, and the vocal artist can speak the different parts at the appropriate times by simply pronouncing the words of the libretto as they pass the pointer 24.

If desired, one tape may be supplied with various translations of the text so that different readers can make different sound records in different languages, as English, French, et cet.; each of which can be supplied with the same picture film for use before audiences of different languages respectively.

In Fig. 3 the rotary sound records 22, 22′, 22″, 22‴ are shown as being controlled by the ribbon 5 which is provided with a plurality of slots 25 arranged at appropriate intervals along the ribbon 5 to actuate the electrodes 26 shown in Fig. 12. From the nature of the views only one of the slots is shown.

The electrical transmitter diaphragms 30 for the several rotary sound reproducers 22, are electrically connected together in multiple by the switches 42, and the clutches 27 are thrown into and out of operation successively, as the appropriate one of the slots 25 allow the electrodes 26 to come into contact through the slots.

In this way any requisite number of sound records can be successively brought into action as the picture progresses; and the operator by observing the characters 18, 19, etc. on the ribbon 5 may keep in touch with the progress of the production independently of the pictures.

By reference to Fig. 12, the metronomic means which synchronously operates the picture unit film and the sound unit record, will be understood.

43 indicates a motor for driving the projecting and sound reproducing and transmitting apparatus. The shaft 44 drives the film 2, and by the pinion 45 meshing with the gear 46, drives the shaft 28 at a reduced speed to operate the mandrels 47 and also the ribbon 5 of the sound reproducing and transmitting apparatus.

The bus-bar and the scale plate 55 are shown in Fig. 5 as carrying two sets 56, of numerals indicating from zero to 100 turns of the record groove. The records 22 shown, are of double length and each is considered as two record sections and consequently the numerals $n$ on the bus-bar and $p$, $q$ on the scale plate, are arranged in two series corresponding to the double sections of each sound record and the sections of the film.

It is thus seen that the work of producing the talking motion picture is reduced by this discovery and invention to a few simple principles and an exact application; and that in practice the following course is followed:—

1st. The motion picture film is produced in the usual way.

2nd. The pictures or frames of the film are numbered so that they may be indexed.

3rd. A register tape having numbered sections corresponding to the numbered pictures of the film is run in synchronism with the film while the film is slowly run to project the pictures successively on a screen: and during such projection the registrar writes upon the tape at a place indicated by the stationary pointer 24, the dialogue or other sound action which is to accompany the picture action. This operation is indicated in Fig. 1.

4th. Next the reader or sound recorder runs the record device in synchronism with the inscribed tape at the speed required for reproduction and reads into the record horn 57 the dialogue to accompany the motion picture as the words of the dialogue pass a stationary point corresponding to that above referred to. When one record device is filled the apparatus is stopped by throwing the switch 58. The tape may have slots 25 adapted to automatically throw successive rotary sound record devices into operation.

The recording may be done with the mechanism illustrated in Figs. 4 and 5, the diaphragm used being in that instance a recording diaphragm while the reproduction is provided for by using reproducing phonographic diaphragms as reproducers and using transmitting telephonic diaphragms 59 inserted in the tone arm $w$ of the reproducer as in Fig. 6, as transmitters.

5th. The picture film is inserted into the projector 16 with its zero picture frame thrown on the screen, and the sound records that have been produced are placed upon the mandrels of the reproducing apparatus shown in Fig. 3 with all of said records at zero. That is to say the diaphragms 30 all being placed at zero, the ribbon or tape 5 will be placed in position with the first slot 25 in position to allow the electrodes for throwing the first clutch to engage, thus causing the sound record to be operated in synchronism with the film when the motor is operated. Said ribbon 5 has the slots arranged at the beginning of each sound record device, so that when one record is exhausted the clutch for the next record will be engaged so that the second record operates instead of the first; and so on to the end of the performance.

The metrical indexing herein shown applies to all forms of recording and reproducing synchronous means, whether rotary appliances, ribbons or films in which identifying characters are used to synchronize the separately produced features of play or drama. That is, the photographic moving picture, voice of actors, and tones or sounds incident to a living drama are separately produced and then brought together in complete harmony by the hereinbefore referred to indexing and appliance.

In Fig. 9 the strip or tape $t$ is shown with the underscore lines 19, 19″, 19′ arranged in staggered relation so that the eye will distinguish them readily as the strip moves along in front of the operator.

I claim.

1. In the art of metrical optic and acoustic recording for reproduction, the method set forth of recording sounds to be reproduced as an accompaniment to a motion picture; which method comprises providing a ribbon with numbered spaces numerically corresponding with the spacings of the picture film to be used in connection with the sound reproduction; said spaces being of reduced width relative to the picture spaces or frames on the film; applying to said ribbon a readable record of the sounds to accompany the pictures, respectively; placing the parts of the readable record that are appropriate to predetermined parts of the picture production, across the spacings which represent the picture reproduction; then running the ribbon at a speed which is relatively slow compared with the normal speed of the film in producing the picture to be accompanied; so that during a period corresponding to a predetermined period of picture production, the ribbon will move at such a speed as to allow the person acting as sound recorder, to read the record in time with the proposed picture production.

2. In the art of metrical optic and acoustic recording for reproduction, the method set forth of recording sounds to be reproduced as an accompaniment to a motion picture; which method comprises providing a ribbon with numbered spaces numerically corresponding with the spacings of the picture film to be used in connection with the sound reproduction; said spaces being of reduced width relative to the picture spaces or frames on the film; applying to said ribbon a readable record of the sounds to accompany the pictures, respectively; placing the parts of the readable record that are appropriate to predetermined parts of the picture production, across the spacings which represent the picture reproduction; then running the ribbon at a speed which is relatively slow compared with the normal speed of the film in producing the picture to be accompanied; so that during a period corresponding to a predetermined period of picture production, the ribbon will move at such a speed as to allow the person acting as sound recorder, to read the record in time with the proposed picture production; then reading from the slow motion ribbon into a sound recorder which is running at the speed appropriate to synchronize the sound record and its reproduction with a normal picture production from such film, and thus producing a normal speed sound record adapted to the normal film speed.

3. In the art of metrical, optical and acoustic recording, a metrically indexed reading tape and synchronized therewith a metrically indexed picture production for use in sound record production; said tape comprising a metrical sound indicating strip containing an optical record of the sound accompaniment of the picture production, arranged in metrical relation to the appropriate optical parts of such production.

4. In the art of metrical, optical and acoustic recording, a reading tape synchronized with a picture production for use in sound record production; said tape comprising a metrical sound indicating strip containing a written record of the sound accompaniment of the picture production arranged in metrical relation with the appropriate optical parts of such production; and provided with a scale and index marks and adapted to run in synchronism with the sound recorder so that by operating the said tape and record synchronously, the person who is to produce the sound record can read his part into the sound recorder from the sound indicating marks on the tape as they progress within his vision past a predetermined point; thereby to produce the requisite sound accompaniment in true time relation predetermined by the picture.

5. Apparatus for use in the art of optic and acoustic recording and reproducing, comprising indexed metrical sound reproducing means, indexed metrical picture projecting means and a metrical index reading tape therefor, in combination with means adapted to synchronously operate the picture projecting means and said sound reproducing means.

6. In the art of producing talking motion pictures; a strip provided with transverse lines to represent picture frame spaces; index numbers for said spaces; sound marks along said strip; and lines extending along the strip and across the spaces to indicate the period of picture exhibitions covered by parts of the sound action.

7. In the art of producing talking motion pictures; a strip provided with transverse lines to represent picture frame spaces; index numbers for said spaces; sound marks along said strip; and lines extending along the strip and across the spaces to indicate the period of picture exhibitions covered by parts of the sound action; said lines being in staggered relation to each other.

8. In the art of producing talking motion pictures the combination of an indexed metrical photographic film; an indexed metrical recording tape; and an indexed metrical sound producing device synchronously operated with said film and said tape; and including the combination of a segmental circumferential index for said sound producing device, and a longitudinal metrical indexed sound record device for use in the preparing and producing of an optical and auditory performance, and providing means whereby the words to be spoken during a predetermined portion of the film may be determined without operating the photographic film and the sound producing device.

9. Apparatus for use in the art of metrical, optic and acoustic recording for reproduction, as set forth, comprising means for recording and reproducing sounds; said means including a record device marked off to represent sound units, a picture film marked to indicate picture units and an index strip marked off to represent time units, substantially as set forth; said units being definitely and correspondingly marked and coordinated by corresponding ordinals so that production with reference to the sounds represented by the sound units can be made to coordinate with production of pictures by the picture unit without confusion.

10. In the art of reproducing sounds accompanied motion pictures, the method of producing a sound record to accompany the motion picture film, which consists in first consecutively numbering the picture frames on the film; second moving a register ribbon having numbers corresponding to those shown on the picture film and relatively spaced according to the pictures on the film, and marking upon the register ribbon, indications of the sounds appropriate to the action exhibited by the pictures, respectively, on the motion picture film; third causing a projection of a motion picture from the film, and moving the register ribbon to bring the numbered sections thereon to view in consonance with the correspondingly numbered frames as the picture is projected, and simultaneously producing sounds in accordance with those indicated on the register ribbon as the register ribbon is brought into predetermined position respectively, for such production.

11. In the art of producing synchronized motion picture and sound productions, the method which consists in first producing an indexed motion picture film, then projecting the same and from said projection producing a reading tape which is optically synchronized with the motion picture projection; and then using the reading tape as a guide for producing a sound accompaniment to the picture projection.

12. Apparatus for producing talking motion pictures comprising a mechanically driven reading record having markings indicating the time in which its parts shall be read, and mechanically driven motion picture projection mechanism and sound producing mechanism, marked, adapted, and arranged to operate in time with the reading record.

13. The apparatus substantially set forth, comprising a film marked off into indexed picture units; a sound record device marked off into indexed sound units, corresponding to the picture units; a reading tape marked off into indexed time unit spaces; and mechanism adapted to alternatively run the picture record in synchronism with the indexed film at one time and with the indexed sound record at another time so that the reading tape may at the one time be marked to indicate the sounds appropriate to the picture, and at another time may be run synchronously with the sound record device to enable the sound record to be produced thereon according to the index.

In testimony whereof, I have hereunto set my hand at Los Angeles, California, this 29th day of January, 1920.

CYRUS NEWTON ANDREWS.